(12) United States Patent
Dewberry et al.

(10) Patent No.: US 6,847,869 B2
(45) Date of Patent: Jan. 25, 2005

(54) SOFTWARE BASED BRAKE SHOE WEAR DETERMINATION

(75) Inventors: James T. Dewberry, Moore, SC (US); David E. Schweikert, Moore, SC (US); Robert N. Scharpf, Greer, SC (US)

(73) Assignee: Westinghouse Air Brake Technologies Corporation, Wilmerding, PA (US)

( * ) Notice: Subject to any disclaimer, the term of this patent is extended or adjusted under 35 U.S.C. 154(b) by 44 days.

(21) Appl. No.: 10/339,030

(22) Filed: Jan. 9, 2003

(65) Prior Publication Data

US 2004/0138791 A1 Jul. 15, 2004

(51) Int. Cl.$^7$ .............................. G06F 7/00; B60K 6/02
(52) U.S. Cl. ..................... 701/29; 303/3; 18/1.11 R; 18/382; 477/182; 477/189
(58) Field of Search .................... 701/29, 36; 303/3; 188/1.11 R, 382; 477/182, 189

(56) References Cited

U.S. PATENT DOCUMENTS 6,351,701 B2 * 2/2002 Minowa et al. ............... 701/70

* cited by examiner

Primary Examiner—Olga Hernandez
(74) Attorney, Agent, or Firm—Webb Ziesenheim Logsdon Orkin & Hanson, P.C.

(57) ABSTRACT

By calculating energy used by friction brake equipment, the amount of friction brake shoe/pad wear is monitored. As amount of energy supplied reaches a percentage of the friction brake shoe/pad energy design limit, and indication for inspection is provided. If the supplied friction energy continues to increase the brake material must be replaced. The software logic limits are tunable for custom configuration by maintainace personnel. This invention measures amount of friction effort supplied with respect to time and distance in a software controller brake system and allows the software to determine when the friction brake material must be replaced on actual data and avoids costly damage from braking with worn out shoes/pads. This invention annunciates through the software when the friction material requires inspection and replacement and provides software logic to indicate remaining material thickness.

21 Claims, 1 Drawing Sheet

SOFTWARE-BASED BRAKE SHOE WEAR INDICATION

SOFTWARE BASED BRAKE SHOE WEAR DETERMINATION

FIELD OF THE INVENTION

The present invention generally relates, to brake shoes and pads used on a transit railway vehicle and, more particularly, this invention relates to a computer software program for indicating and controlling brake shoe and/or brake pad wear on an electronically controlled passenger transit vehicle and, still more particularly, this invention relates to a software program in a microprocessor system designed to monitor continuous brake shoe/pad thickness in percentages and display wear data to maintenance personnel and operators between scheduled inspection intervals.

BACKGROUND OF THE INVENTION

The following background information is provided to assist the reader to understand the invention described and claimed herein. Accordingly, any terms used herein are not intended to be limited to any particular narrow interpretation unless specifically so indicated.

There is presently known in the prior art, typically on transit vehicles utilizing electronic controls, that electrically propelled transit vehicles and locomotives are braked by a combination of dynamic brakes and friction brakes. On these transit vehicles, the friction brake effort varies based upon braking effort requested and the amount of dynamic braking supplied. As a result, it is difficult to use simple distance or time based intervals to inspect the friction brake material for wear. In the prior art, life remaining for friction brake material in a transit vehicle is determined currently by scheduled visual inspection, followed by a "best guess" as to whether the brake material will last until the next scheduled inspection. If there is a failure in the dynamic friction brake equipment and this failure goes unreported there is a heightened risk for equipment damage due to uneven friction brake usage between different parts of the same train consists. Therefore, making spot inspections unreliable. In the prior art, if the brake system equipment failure were to occur just after a scheduled train inspection, there is the potential to completely wear the brake shoe/pad away before the next scheduled inspection due to continual changes in dynamic and friction braking effort.

SUMMARY OF THE INVENTION

The present invention provides a software-based apparatus for determination of brake shoe/pad wear. Such software-based apparatus includes a friction brake effort means disposed to receive and combine a brake cylinder pressure signal and a brake cutout indication signal for determining friction brake effort and for generating a friction brake effort signal. There is a signal multiplication means connected to receive such friction brake effort signal and combine it with a car speed signal for determining an amount of energy being absorbed during a software-based logic cycle and to generate an absorbed energy signal. An integration with respect to time means is provided. Such integration with respect to time means is connected to receive the absorbed energy signal and combine it with a brake shoe/pad change out signal for summing a resultant energy and then generating a friction energy summation signal. The final essential element of the present invention is an evaluation of energy absorption level means connected to receive the friction energy summation signal and combine it with a brake shoe energy absorption limit signal in order to generate at least one of a brake shoe inspection request signal and a brake shoe/pad remaining signal.

OBJECTS OF THE INVENTION

It is, therefore, one of the primary objects of the present invention to provide a means to annunciate electronically through a software-based brake shoe/pad wear determination program to maintenance personnel and operators when the brake material should be inspected or replaced.

Another object of the present invention is to provide a software-based brake shoe/pad wear determination apparatus which will provide maintenance personnel with an indication of wear to reduce equipment damage due to using the brake shoes or brake pads beyond their useful life.

Still another object of the present invention is to provide a software-based brake shoe/pad wear determination apparatus which is operable on any transit vehicle brake arrangement, on a single car or multiple cars utilizing electronic controls for friction braking.

Another object of the present invention is to provide software-based brake shoe/pad wear determination apparatus which enables measuring the friction brake effort in terms of pressure.

A further object of the present invention is to provide to maintenance personnel or the operator via a software-based brake shoe/pad wear determination apparatus using a digital input for brake cutout that indicates when the friction brakes have been cutout or are inoperative, i.e., when there is no pressure (force) provided by the friction brake system.

Still another object of the present invention is to provide a software-based brake shoe/pad wear determination apparatus which calculates the energy used by the friction brake effort supplied with respect to time and distance.

And still another object of the present invention is to provide a software-based brake shoe/pad wear determination apparatus which indicates the remaining brake shoe/brake pad material thickness in percentages.

Another object of the present invention is to provide a software-based brake shoe/pad wear determination apparatus wherein the brake system may be electronically configured to reduce the amount of friction brake effort supplied, reducing the wear rate of the shoe/pad material.

A further object of the present invention is to provide a software-based brake shoe/pad wear determination apparatus which determines the amount of energy required to provide a specific friction brake effort on a specific brake system.

And still another object of the present invention is to provide a software-based brake shoe/pad wear determination apparatus which monitors on each logic cycle, brake shoe/pad remaining output and brake shoe inspection request output.

Although a number of objects and advantages of the present invention have been described in some detail above, various additional objects and advantages of the apparatus of the Software-Based Brake Shoe/Pad Wear Determination program of the present invention will become more readily apparent to those persons who are skilled in the art from the following more detailed description of the invention, particularly, when such detailed description of the invention is taken in conjunction with both the attached Tables 1 and 2, FIG. 1 and the appended claims.

DETAILED DESCRIPTION OF A PRESENTLY PREFERRED EMBODIMENT OF THIS INVENTION

Figure 1:
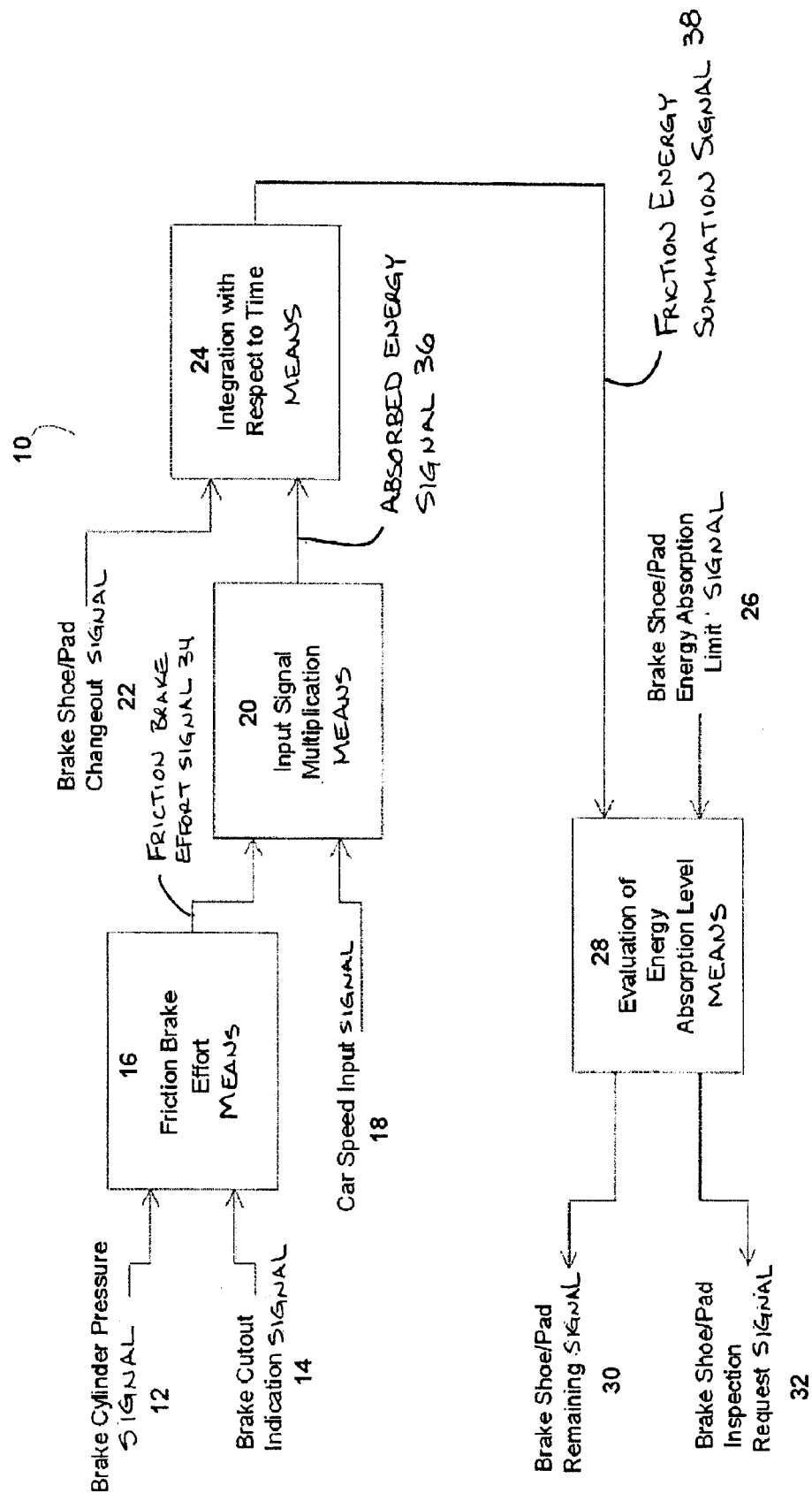
FIG. 1 is a block drawing showing a presently preferred embodiment of a software-based brake shoe/pad wear determination program for use on an electronically controlled transit vehicle.

In the presently preferred embodiment, this invention provides an apparatus to annunciate electronically through a software-based brake shoe/pad wear determination program, when brake material should be inspected and/or replaced based on the amount of energy supplied over time. The presently preferred embodiment of this invention also provides an apparatus to annunciate electronically to maintenance personnel and operators, through this software-based brake shoe wear determination program, remaining brake shoe/pad thickness in descending percentages related to replacement, wear limit and equipment damage, thus avoiding equipment damage as a result of undetected rapid wear of the brake shoe/pad.

In the presently preferred embodiment, there is provided a software-based program for monitoring transit vehicle brake shoe/pad wear for inspecting and replacing brake shoes/pads before damage to equipment occurs.

Reference is now made to FIG. 1. Illustrated therein is a presently preferred embodiment of the Software-Based Brake Shoe/Pad Wear Determination, generally designated 10. Comprised within the Software-Based Brake Shoe/Pad Wear Determination 10 is an apparatus for use on an electronically controlled transit vehicle (not shown) to determine brake shoe/pad wear. The presently preferred embodiment includes a Friction Brake Effort Means 16 which combines a Brake Cylinder Pressure Signal 12 and a Brake Cutout Indication Signal 14. The Brake Cylinder Pressure Signal 12 provides an analog input to measure the friction brake effort in terms of pressure, and the Brake Cutout Indication Signal 14 is a digital signal that indicates when the friction brakes have been cutout. It should be understood that friction brake effort is the amount of force supplied to the wheel by the brake shoe/pad, and a cutout occurs when there is no pressure (force) provided by the friction system. Furthermore, it should be also understood that the Brake Cutout Indication Signal 14 indicates that the friction brakes are inhibited after the brake force system, and therefore no force is supplied, and the Brake Cutout Indication Signal 14 may not be required depending on the brake equipment arrangement. These signals 12 and 14 are combined into the Friction Brake Effort Means 16 for generating a Friction Brake Effort (FBE) Signal 34. The FBE Signal 34 is determined by calculating the amount of brake effort (force) supplied during braking during a logic cycle. The brake effort (force) is calculated from a predetermined equation that represents brake shoe/pad usage in comparison to the performance of the tread or disc brake unit in to the Brake Cylinder Pressure Signal 12. The FBE Signal 34 may be defined as zero, if the Brake Cutout Indication Signal 14 is enabled.

In the presently preferred embodiment, such apparatus also includes a Signal Multiplication Means 20 which combines the FBE Signal 34, and the Car Speed Signal 18. The FBE Signal 34 is the total amount of brake effort (force) supplied during a logic cycle in the software, and the Car Speed Signal 18 is the vehicle speed value for determining the amount of energy supplied. The Signal Multiplication Means 20 combines signals 34 and 18 for determining the amount of energy being absorbed during a logic cycle in the software and generating an Absorbed Energy Signal 36.

Additionally, in the presently preferred embodiment, such apparatus includes an Integration With Respect To Time Means 24 which combines the Absorbed Energy Signal 36 and the Brake Shoe/Pad Changeout Signal 22. In this case, the Absorbed Energy Signal 36 is the amount of brake effort (force) supplied during a logic cycle in the software, and the Brake Shoe/Pad Changeout Signal 22 is a digital, or network, signal which indicates to the software that the brake shoes/pads have been replaced, and forces the software data values for wear indication to reset to the default values for new brake shoe/pads. The Integration With Respect To Time Means 24 sums the resultant energy from the FBE Signal 34 with the energy summation from previous logic cycles to determine the total energy, or work, absorbed by the brake shoe/pads, and generates a Friction Energy Summation Signal 38 which is the current amount of total energy supplied by the friction brakes until it receives an indication signal from the Brake Shoe/Pad Changeout Signal 22 at which time the Friction Energy Summation Signal 38 is reset to zero to indicate brake shoe/pad replacement.

In the presently preferred embodiment, such apparatus further includes an Evaluation of Energy Absorption Level Means 28 which combines the Friction Energy Summation Signal 38 and the Brake Shoe Energy Absorption Limit Signal 26. The Friction Energy Summation Signal 38 is the current amount of total energy supplied by the frictions brakes since the last brake shoe/pad replacement, and the Brake Shoe Energy Absorption Limit Signal 26 is a predetermined value for a brake shoe/pad, which correlates to the life of the material in terms of available energy. The Energy Absorption Level Means 28 has two functions. Such means provides a first function comparing the total friction energy summation developed in the Integration With Respect To Time Means 24 with the Brake Shoe Energy Absorption Limit Signal 26, to determine if the Brake Shoe Inspection Request Signal 32 should be turned ON. Such means includes the comparison limit in the software program as an adjustable value. The Brake Shoe Inspection Request Signal 32 from the Evaluation of Energy Absorption Level Means 28 can be connected to an LED for providing a visual indication to maintenance personnel or the operator, or such means can be used to generate a network message on a monitoring/diagnostic type brake effort monitor system. Furthermore, such means provides a second function which generates a Brake Shoe/Pad Remaining Signal 30 by estimating the remaining friction brake shoe/pad thickness in terms of the percentage of material life remaining through the software logic program. Additionally, the Brake Shoe/Pad Remaining Signal 30 may be displayed on the friction brake control unit's internal display, portable test equipment displays, or as a network message on a brake monitoring/diagnostic type brake effort monitor system.

Table 1 shows a simulated transit car brake shoe/pad thickness by descending wear in percentages for Car A and Car B, using ten scheduled inspection intervals for this example between inspections on a transit brake system. In this case, the brake shoe/pads are normally replaced at inspection interval 20. Additionally, an apparatus provided for the purpose of this example, the criteria for friction shoe/pad change out when 50% or less of the friction brake shoe/pad is remaining at inspection. Such means provide that at or below this level requires the friction brake shoes/pads to be replaced.

In the presently preferred embodiment, such means comprise an apparatus for providing a display to maintenance personnel or the operator via the software-based program, indicating the remaining brake shoe/pad material thickness in percentages. Such means provide using 100% as new brake material and descending percentages to indicate percent of material wear remaining, using less than 50% as the criteria for brake shoe/pad change out and 35% as the brake shoe/pad wear limit.

As can been seen the data in Table 1 on a transit vehicle without benefit of the Software-Based Brake Shoe/Pad Wear Determination program. Demonstrated in this data, the loss of 50% of dynamic brake effort at interval 11, significantly increased friction brake shoe/pad wear percentage. Table 1 shows that by interval 15 for Car B, the friction brake shoe/pad thickness is 0% meaning there is no remaining brake shoe/pad and equipment damage would begin. Also, shown in Table 1 is that by interval 13, the brake show/pad thickness percentage had dropped to 33.3%, below the established 35% wear limit percentage. It also shows that by normal inspection interval 20 in this example, damage to the equipment on Car B would be extensive.

presently preferred embodiment, the apparatus provides at inspection interval 13 in Table 2 that annunciates electronically to maintenance personnel and the operator that the brake shoe/pad thickness percentage has dropped below the 35% wear limit to 33.3%, and that Car B requires brake shoe/pad change out. The presently preferred apparatus also shows a reduction in percentage of friction braking effort in relation to a reduction in brake shoe/pad thickness percentage in contrast to the data at inspection interval 13 of the prior art in Table 1.

Furthermore, in the presently preferred embodiment, the apparatus provides in Table 2 the Software-Based Brake Show/Pad Wear Determination program at inspection interval 15 showing brake shoe/pad thickness for Car B at 10% without equipment damage, compared to the same interval

TABLE 1

| Interval | Scheduled Inspection | Car A | | | Car B | | |
|---|---|---|---|---|---|---|---|
| | | Dynamic Brake Effort | Friction Brake Effort | Brake Shoe/Pad Thickness | Dynamic Brake Effort | Friction Brake Effort | Brake Shoe/Pad Thickness |
| 0 | Yes | — | — | 100% | — | — | 100% |
| 1 | | 95% | 5% | 98.3% | 95% | 5% | 98.3% |
| 2 | | 95% | 5% | 96.7% | 95% | 5% | 96.7% |
| 3 | | 95% | 5% | 95.0% | 95% | 5% | 95.0% |
| 4 | | 95% | 5% | 93.3% | 95% | 5% | 93.3% |
| 5 | | 95% | 5% | 91.7% | 95% | 5% | 91.7% |
| 6 | | 95% | 5% | 90.0% | 95% | 5% | 90.0% |
| 7 | | 95% | 5% | 88.3% | 95% | 5% | 88.3% |
| 8 | | 95% | 5% | 86.7% | 95% | 5% | 86.7% |
| 9 | | 95% | 5% | 85.0% | 95% | 5% | 85.0% |
| 10 | Yes | 95% | 5% | 83.3% | 95% | 5% | 83.3% |
| 11 | | 95% | 5% | 81.7% | 50% | 50% | 66.7% |
| 12 | | 95% | 5% | 80.0% | 50% | 50% | 50.0% |
| 13 | | 95% | 5% | 78.3% | 50% | 50% | 33.3% |
| 14 | | 95% | 5% | 76.7% | 50% | 50% | 16.7% |
| 15 | | 95% | 5% | 75.0% | 50% | 50% | 0.0% |
| 16 | | 95% | 5% | 73.3% | 50% | 50% | −16.7% |
| 17 | | 95% | 5% | 71.7% | 50% | 50% | −33.3% |
| 18 | | 95% | 5% | 70.0% | 50% | 50% | −50.0% |
| 19 | | 95% | 5% | 68.3% | 50% | 50% | −66.7% |
| 20 | Yes | 95% | 5% | 66.7% | 50% | 50% | −83.3% |

Table 2 shows a presently preferred embodiment for a simulated transit car brake shoe/pad thickness by descending wear in percentages for Car A and Car B, using ten scheduled inspection intervals as an example between inspections on a transit brake system, using the Software-Based Brake Shoe/Pad Wear Determination program and the benefits thereof shown in column WI of this table.

In the presently preferred embodiment, an apparatus provides the Software-Based. Brake Shoe/Pad Wear Determination logic process with the data provided in Table 2 and the benefits thereof.

In the presently preferred embodiment, an apparatus provides the Software-Based Brake Shoe/Pad Wear Determination program data in column WI of Table 2. In the

15 in the prior art shown in Table 1 whereas equipment damage occurred.

In the presently preferred embodiment, the apparatus also provides through this software-based program that the brake system can be electronically configured to reduce the amount of friction brake effort supplied to reduce the wear rate of the shoe/pad. Such presently preferred apparatus would help prevent costly equipment damage and serve as a secondary indication to inspect the transit vehicle brake system.

TABLE 2

| Interval | Scheduled Inspection | Car A | | | | Car B | | | |
|---|---|---|---|---|---|---|---|---|---|
| | | Dynamic Brake Effort | Friction Brake Effort | Brake Shoe/Pad Thickness | WI | Dynamic Brake Effort | Friction Brake Effort | Brake Shoe/Pad Thickness | WI |
| 0 | Yes | — | — | 100% | OK | — | — | 100% | OK |
| 1 | | 95% | 5% | 98.3% | OK | 95% | 5% | 98.3% | OK |

TABLE 2-continued

| | | Car A | | | | Car B | | | |
|---|---|---|---|---|---|---|---|---|---|
| Interval | Scheduled Inspection | Dynamic Brake Effort | Friction Brake Effort | Brake Shoe/Pad Thickness | WI | Dynamic Brake Effort | Friction Brake Effort | Brake Shoe/Pad Thickness | WI |
| 2 | | 95% | 5% | 96.7% | OK | 95% | 5% | 96.7% | OK |
| 3 | | 95% | 5% | 95.0% | OK | 95% | 5% | 95.0% | OK |
| 4 | | 95% | 5% | 93.3% | OK | 95% | 5% | 93.3% | OK |
| 5 | | 95% | 5% | 91.7% | OK | 95% | 5% | 91.7% | OK |
| 6 | | 95% | 5% | 90.0% | OK | 95% | 5% | 90.0% | OK |
| 7 | | 95% | 5% | 88.3% | OK | 95% | 5% | 88.3% | OK |
| 8 | | 95% | 5% | 86.7% | OK | 95% | 5% | 86.7% | OK |
| 9 | | 95% | 5% | 85.0% | OK | 95% | 5% | 85.0% | OK |
| 10 | Yes | 95% | 5% | 83.3% | OK | 95% | 5% | 83.3% | OK |
| 11 | | 95% | 5% | 81.7% | OK | 50% | 50% | 66.7% | OK |
| 12 | | 95% | 5% | 80.0% | OK | 50% | 50% | 50.0% | OK |
| 13 | | 95% | 5% | 78.3% | OK | 50% | 50% | 33.3% | Inspect |
| 14 | | 95% | 5% | 76.7% | OK | 50% | 40% | 20% | Reduce |
| 15 | | 95% | 5% | 75.0% | OK | 50% | 30% | 10% | Reduce |
| 16 | | 95% | 5% | 73.3% | OK | 50% | 20% | 3.3% | Reduce |
| 17 | | 95% | 5% | 71.7% | OK | 50% | 10% | 0% | Reduce |
| 18 | | 95% | 5% | 70.0% | OK | 50% | 0% | 0% | Reduce |
| 19 | | 95% | 5% | 68.3% | OK | 50% | 0% | 0% | Reduce |
| 20 | Yes | 95% | 5% | 66.7% | OK | 50% | 0% | 0% | Reduce |

While both the presently preferred and a number of alternative embodiments of the present invention have been described in detail above it should be understood that various other adaptations and modifications of the present invention can be envisioned by those persons who are skilled in the relevant art of anti-lock brake systems without departing from either the spirit of the invention or the scope of the appended claims.

We claim:

1. A software-based apparatus for determination of brake shoe/pad wear, said software-based apparatus comprising:
   a) a friction brake effort means disposed to receive and combine a brake cylinder pressure signal and a brake cutout indication signal for determining friction brake effort and generating a friction brake effort signal;
   b) a signal multiplication means connected to receive and combine said friction brake effort signal with a car speed signal for determining an amount of energy being absorbed during a software-based logic cycle and generating an absorbed energy signal;
   c) an integration with respect to time means connected to receive and combine said absorbed energy signal with a brake shoe/pad changeout signal for summing a resultant energy and generating a friction energy summation signal; and
   d) an evaluation of energy absorption level means connected to receive and combine said friction energy summation signal with a brake shoe energy absorption limit signal for generating at least one of a brake shoe inspection request signal and a brake shoe/pad remaining signal.

2. A software-based apparatus for determination of brake shoe/pad wear, according to claim 1, wherein said brake cylinder pressure signal is an analog signal for measuring friction brake effort in terms of pressure.

3. A software-based apparatus for determination of brake shoe/pad wear, according to claim 1, wherein said brake cutout indication signal is a digital signal for indicating when a friction brake cutout occurs.

4. A software-based apparatus for determination of brake shoe/pad wear, according to claim 1, wherein said friction brake effort is determined by calculating an amount of brake effort supplied during braking during a logic cycle.

5. A software-based apparatus for determination of brake shoe/pad wear, according to claim 1, wherein said car speed signal is a predetermined value indicating vehicle speed for determining an amount of energy supplied.

6. A software-based apparatus for determination of brake shoe/pad wear, according to claim 1, wherein said absorbed energy signal is an amount of brake effort, in terms of force, supplied during a logic cycle in software.

7. A software-based apparatus for determination of brake shoe/pad wear, according to claim 1, wherein said brake shoe/pad changeout signal is at least one of a digital and networked signal for indicating to said software when said brake shoe/pads have been replaced, and for resetting said software to predetermined default values upon changeout of said brake shoe/pads.

8. A software-based apparatus for determination of brake shoe/pad wear, according to claim 1, wherein said friction energy summation signal is a current amount of total energy supplied by said friction brakes until receiving said brake shoe/pad changeout signal.

9. A software-based apparatus for determination of brake shoe/pad wear, according to claim 1, wherein said brake shoe energy absorption limit signal is a predetermined value for correlating material life in terms of available energy for said brake shoe/pads.

10. A software-based apparatus for determination of brake shoe/pad wear, according to claim 1, wherein said brake shoe inspection request signal is determined to be in a predetermined state.

11. A software-based apparatus for determination of brake shoe/pad wear, according to claim 1, wherein said brake shoe pad remaining signal is determined by estimating said friction brake shoe/pad thickness in terms of percentage of said material life remaining and providing an indication to maintenance personnel.

12. A software-based apparatus for determination of brake shoe/pad wear, according to claim 2, wherein said friction brake effort is an amount of force supplied to a wheel via a brake shoe/pad.

13. A software-based apparatus for determination of brake shoe/pad wear, according to claim 3, wherein said friction brake cutout occurs when there is no pressure, in terms of force, provided by a friction system.

14. A software-based apparatus for determination of brake shoe/pad wear, according to claim 8, wherein reception of said brake shoe/pad changeout signal resets said friction energy summation signal to zero.

15. A software-based apparatus for determination of brake shoe/pad wear, according to claim 10, wherein said predetermined state is "on" for providing an indication to maintenance personnel.

16. A software-based apparatus for determination of brake shoe/pad wear, according to claim 13, wherein said brake cutout is a brake cutout indication when said friction brakes are inhibited and no force is supplied.

17. A software-based apparatus for determination of brake shoe/pad wear, according to claim 13, wherein said brake cutout can be eliminated depending on brake equipment supplied.

18. A software-based apparatus for determination of brake shoe/pad wear, according to claim 11, wherein said indication to said maintenance personnel is at least one of visual and audible.

19. A software-based apparatus for determination of brake shoe/pad wear, according to claim 18, wherein said visual indication is at least one of an LED and networked text message.

20. A software-based apparatus for determination of brake shoe/pad wear, according to claim 18, wherein said audible indication is a horn.

21. A software-based apparatus for determination of brake shoe/pad wear, according to claim 15, wherein said indication to said maintenance personnel is at least one of visual and audible.

* * * * *

UNITED STATES PATENT AND TRADEMARK OFFICE
CERTIFICATE OF CORRECTION

PATENT NO. : 6,847,869 B2
DATED : January 25, 2005
INVENTOR(S) : Dewberry et al.

It is certified that error appears in the above-identified patent and that said Letters Patent is hereby corrected as shown below:

<u>Title page,</u>
Item [57], ABSTRACT,
Line 4, "and indication" should read -- an indication --
Line 10, "software controller" should read -- software controlled --

Signed and Sealed this

Nineteenth Day of July, 2005

JON W. DUDAS
*Director of the United States Patent and Trademark Office*